Feb. 18, 1964   C. E. KAEMPEN   3,121,283
METHOD FOR PRESSURE WELDING TANKS

Filed Nov. 5, 1959   2 Sheets-Sheet 1

INVENTOR.
CHARLES E. KAEMPEN
BY Thomas S. MacDonald
ATTORNEY

Feb. 18, 1964     C. E. KAEMPEN     3,121,283
METHOD FOR PRESSURE WELDING TANKS
Filed Nov. 5, 1959     2 Sheets-Sheet 2

INVENTOR.
CHARLES E. KAEMPEN
BY Thomas S. MacDonald
ATTORNEY

United States Patent Office 3,121,283
Patented Feb. 18, 1964

3,121,283
METHOD FOR PRESSURE WELDING TANKS
Charles E. Kaempen, Seal Beach, Calif., assignor to North American Aviation, Inc.
Filed Nov. 5, 1959, Ser. No. 851,054
13 Claims. (Cl. 29—471.1)

This invention relates to a novel method of pressure welding high strength hollow structures and more particularly to a method wherein high strength metallic strips are superimposed and wrapped upon a mandrel and subsequently welded together by a shaped explosive charge placed therein, which charge exerts a high order of instantaneous pressure against the wrapped strips so as to produce a high strength pressure welded unitary structure.

Large pressure-fed rocket boosters in the multi-million pound thrust category, using cryogenic or storable propellants, by their very nature do not require the long lead times necessary for the development of very large turbo pumps or solid propellant grains. The relative simplicity, promising reliability and structural ruggedness make them particularly attractive. The greatest disadvantage to date has been the relatively poor booster structure efficiency, i.e., high tank pressures when restrained by the standard structural materials result in excessively heavy tanks. Recent studies concerning pressure fed booster configurations indicate that the employment of tank materials with strength to weight ratios equivalent to those attained by the hereinafter described novel process for welding high pressure tanks, minimizes these weight disadvantages. When compared with large solid propellant boosters, the large pressure fed storable propellant systems offer advantages such as thrust control, ease of propellant storage and handling, as well as pre-flight testing capability.

This invention overcomes the inadequacies of prior art tank forming methods by providing an economical method of fabricating ultra high strength into pressure vessels, tanks, etc. Prior art welding and other similar joining procedures dictate that the area to be joined be post-weld heat treated to recover full joint strength. Conventional welding processes produce an annealed or embrittled zone adjacent the weld. Furthermore, buckling and distortions encountered by the heat treating and standard fabrication of large very thin walled structures prove very disadvantageous. In some prior art methods the thin materials utilized develop their high strength from cold mill work (rolling) and once fabricated by welding, are unable to recover the parent sheet strength. Consequently, their joint efficiency is reduced to the annealed value.

A prime object of this invention is to provide a method for producing high strength pressure tanks wherein prewrapped metallic strips are formed into a pressure welded unitary structure.

A further object of this invention is to produce high strength pressure tanks by utilizing alternate layers of different compositioned high strength metallic strips which are spirally formed and subsequently subjected to an explosive welding technique whereby a high strength tank is formed.

Still another object of this invention is to provide a method for producing high strength pressure tanks wherein fine metallic single crystal filaments such as the ferrite-monocrystalline filaments having superior tensile strength characteristics are placed between the opposing surfaces of spirally wrapped high strength metallic strips and subsequently welded thereto by explosive welding techniques.

The hereinafter described novel method for pressure welding high pressure tanks comprises the step of spiral wrapping alternate layers of high strength metallic strips so that the individual strip edges abut each other. The wrapping is done in such a manner that each successive strip layer overlaps the abutted edges of the previous layer. Subsequent to the spiral wrapping thereof, the structure is placed within either a die conforming to the final external dimensions of pressure tank or a near incompressible die forming medium such as water, and then subjected to an internal explosion through a pressure distributing media such as air or water so as to force the alternate metallic layers into intimate contact and effect a high strength weld therebetween.

Figure 1:
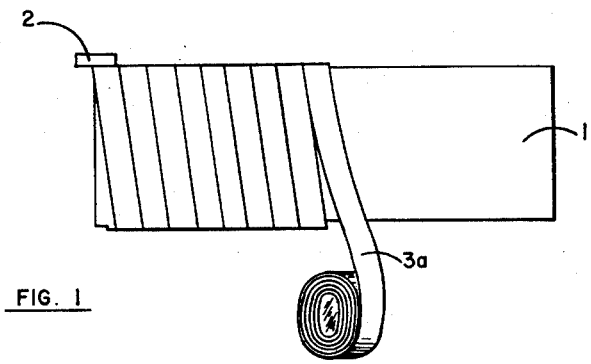
FIG. 1 shows the first step of forming a high pressure tank wherein fine gauge high strength metallic strips are spirally wound about a mandrel.
Figure 7:
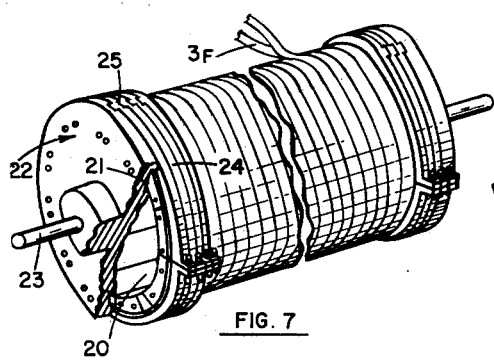
FIG. 7 shows one specific type of collapsible mandrel with metallic strips being spirally wrapped thereon.
Figure 6:
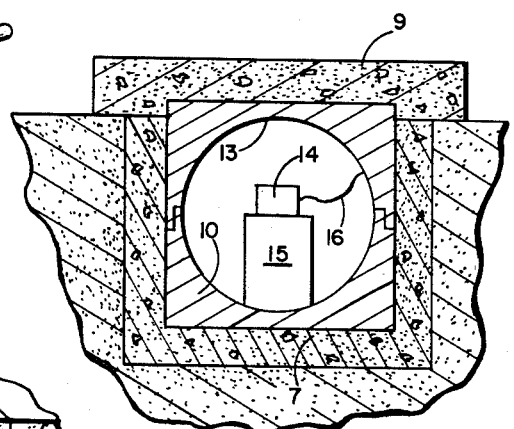
FIG. 6 is the right hand end view of FIG. 5.

Referring now more specifically to the drawings, FIG. 1 discloses a mandrel 1 formed of plaster, wood or other suitable preferably destructible mandrel material on to which a clamp 2 secures a first metallic strip 3a comprising the beginning of the first step of the preferred method. As clearly shown, the first metallic strip 3a is spirally wound onto the mandrel to form a tubular structure. It is to be understood that the cross section of the mandrel may take any desired form depending on the specific requirement and desired finished structure configuration. If so desired, two or more strips may be superimposed to constitute a single layer and subsequently wound on the mandrel (FIG. 7).

Figure 2:
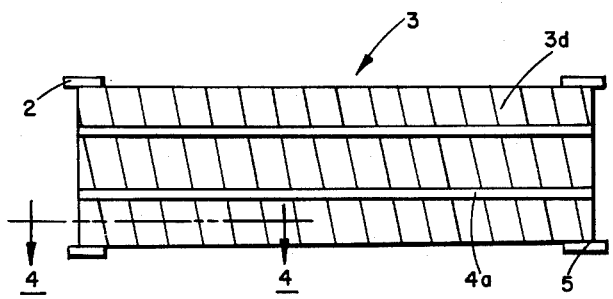
FIG. 2 is a view similar to FIG. 1 showing the structure formed by the spiral winding of the metallic strips.
Figure 3:
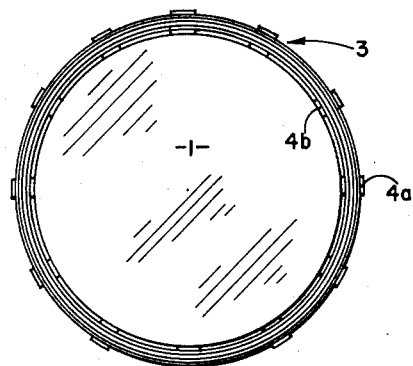
FIG. 3 shows the right hand end view of FIG. 2.

FIG. 2 shows the completion of the first step of the preferred method wherein four alternate layers 3a, 3b, 3c, and 3d (FIG. 4) are wound upon the mandrel to form a tubular structure or tank shell 3. Adhesive strips 4a and 4b (FIG. 3) of fiberglass tape or the like, may be applied to the wound structure so as to keep the layers from unravelling. Clamp 5 may also be placed on the end of the mandrel opposite clamps 2 to further secure the strips. The adhesive strips 4b may be applied to the mandrel 1 prior to the forming of the tank shell 3 so as to aid the removal of the tank shell from the mandrel by maintaining a clearance as shown in FIG. 3 between the innermost layer 3a of the formed structure and the mandrel, during the warpping operation. It is obvious that undue tightening of the formed layers onto the surface of the mandrel is virtually prevented. Thus, the completed shell structure can be expeditiously removed from the mandrel by sliding the same over the adhesive strips 4b, which strips are secured to the mandrel, as above stated.

Figure 4:
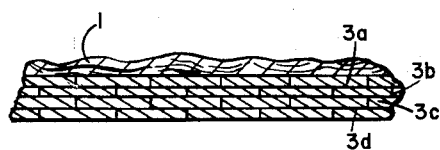
FIG. 4 is a sectional view taken on lines 4—4 of FIG. 2.

As clearly shown in FIG. 4, the alternate layers resulting from the preferred method are placed such that the strips are staggered to overlap the abutting edges of the strip forming the previous layer. Although the completed structure is shown as consisting of four alternate layers, it is to be understood that any desired number of layers may be employed. For example, a single strip may be utilized and formed into a unitary pressure welded structure by overlapping instead of positioning the adjacent strip portions into abutting relation. Furthermore, the strips may be wound on the mandrel with the edges thereof askewed with respect to the strip edges of the previous layers (i.e., less than 180°, but more than 90°), so as to selectively orientate the grain directions of the alternate layers and impart predetermined strength characteristics in more than one direction thereto.

The success of pressure welding depends not only upon the material to be welded, but also upon the relative hardness, surface finish, oxide films adhering to the surfaces thereof, and to the degree of pressure employed in the welding process. Generally speaking, greater success is met in pressure welding when dissimilar materials, such as steel and aluminum are welded to each other. The reason for this is that the asperites of the harder material can more easily puncture the oxide film of the softer material, permitting grain growth across their interface. Unquestionably, one of the most difficult tasks is to pressure weld hard steel to hard steel; however, with the magnitude of pressure provided by applicant's hereinafter described explosive welding technique and by taking great care to remove the oxide film on the hard steels, the welding thereof is made possible.

Current availability of steel ribbon, 2–4 in. wide and 5–12 mil thick possessing tensile strength in excess of 300,000 p.s.i. presents an excellent material from which to fabricate lightweight, high strength pressure booster tanks. Such a steel is made available by the International Nickel Company and is termed Tri-Cent, 300M steel.

Although the alternate layers may be formed of individual ribbons of high strength steel, another metallic strip 3F such as aluminum (FIG. 7) may be superimposed on the steel strips and wound therewith.

Figure 4A:
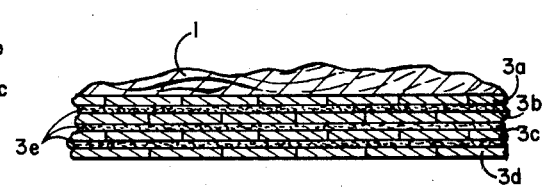
FIG. 4a is a sectional view similar to FIG. 4 showing an alternate method of forming a spirally wound structure.

Fine metallic or non-metallic single crystal filaments or whiskers possessing superior tensile strength in the region of one million p.s.i. may also be positioned between the alternate steel strip layers. A full disclosure of these fine single crystal filaments may be found in the September 1958 Journal of Metals, vol. 10, No. 9. The monocrystalline particles $3e$ of FIG. 4a disclose such an alternate method wherein the whiskers $3e$ are coated or magnetically held on the spirally wound high strength metallic layer $3a$ and a second metallic strip layer $3c$ is wound over the resulting layer of whiskers. The same procedure may be followed by again coating whiskers $3e$ on layers $3b$ and $3c$. The subsequent welding thereof produces a tank of superior strength.

Figure 5:
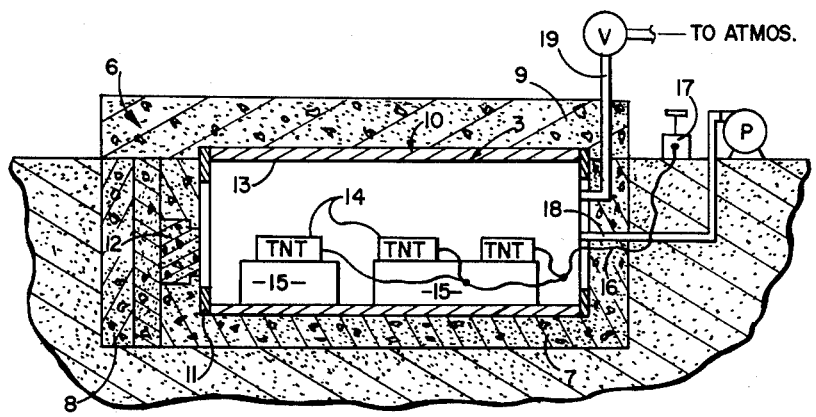
FIG. 5 shows the spirally wound structure of FIG. 2 removed from the mandrel and placed horizontally in a die cavity prior to the welding thereof.

Subsequent to forming the alternate layered spirally wound structure 3, the structure is placed in a cavity formed in a die housing 6, as shown in FIG. 5. The die housing is formed of a stationary portion 7 and removable blocks or shims 8. The removable blocks or shims 8 may be selectively inserted depending on the desired length of tank to be formed. A heavy cover 9 comprises part of the die housing and is adapted to be placed and secured over the spirally wound structure 3. The stationary portion 7, removable blocks 8 and cover 9 are preferably constructed of reinforced concrete; however, any other similar high density shock absorbing material would suffice.

Filler blocks 10 and shims 11 constituting a female die, are preferably metallic and are machined to the required external dimension of the tank. It is to be understood that the filler blocks 10 and shims 11 may be mounted around the pre-wrapped spirally wound structure 3 prior to its insertion in the cavity of the die housing 6.

It is preferred that the heavily reinforced cavity be sufficient to withstand the severe pressure in the order of several million p.s.i. required in the pressure welding process. Adhesive backed Mylar sheet or other suitable thin plastic film may be coated upon the internal tank surfaces to keep the structure water tight and prevent oxidation thereof prior to the explosion.

Access to the internal portion of the tank may be provided in the form of a plug 12 into which a man could enter for placement of the explosive and sundry adjustments and maintenance.

A conventional type explosive or charge 14 such as TNT is placed and secured on foamed plastic or other similar shock absorbing type blocks 15 within the cavity. The explosive is shaped to impart a predetermined force to each increment of the preformed structure. Since it may be desirable to impart varying wall strengths to the same structure as dictated by the specific application (e.g. fuel tank, nozzles, rocket motor cases, etc.) the explosive may be shaped in accordance therewith. Also, when a die medium such as water is utilized, the varying hydrostatic pressures therein to some degree dictate the shape of the explosive.

Electrical connecting lines 16 connect a control detonator 17 to the explosives 14. A line 18 is connected to an outside force distributing media such as water and the cavity is filled therewith. When a media such as water is utilized, it is preferred to form an air bleed cavity 19 in the die housing so that entrapped air therein is permitted to bleed off.

After the cavity is filled with the force distributing media, the explosion is detonated. The construction of the cavity and cooperating die are such as to be able to withstand the tremendous pressures exerted by the explosive force and the metallic strips are squashed together by the enormous force so as to instantaneously weld them into a unitary homogeneous tank shell which at least retains the original strength characteristics of the initial metallic strips.

The finished tank shell is then removed from the die housing 6 and ends are fabricated thereto by conventional welding methods, etc. It is to be understood that the ends may be pressure welded to the tank shell and simultaneously to the wall forming thereof.

Since longitudinal stresses are only half as great as hoop stresses, one outstanding functional feature of the aforedescribed method is to permit construction of a tank shell which can be effectively sealed against wall leakage and subsequently have the ends fabricated thereto.

Figure 8:
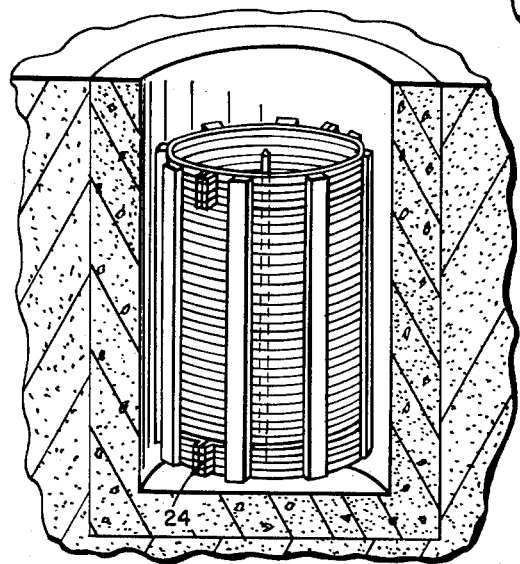
FIG. 8 shows the vertically positioned spirally wound structure of FIG. 7 placed in a water die forming medium.

FIG. 7 discloses a specific embodiment of a collapsible mandrel for the spiral wrapping of the tubular structure or tank shell 3. The ends of collapsible mandrel members 20 are adapted to be radially spaced by groove 21 formed on end clamp plates 22. Shafts 23 constitute an axis about which the mandrel is rotated during the spiral forming of the strips. Clamps 24 secure the end of each succeeding strip; that is, the outermost clamps secure the first wound strip (or superimposed plurality of strips) and the adjacent clamp the next. Lug 25 of the outermost clamps engage with a complementary notch on the clamp plates 22 to prevent rotation thereof. A notch on the outermost clamps cooperates with a similar lug on the adjacent clamp etc., to secure the clamps 24 relative to the clamp plates 22. When the spiral wrapping of the strips is completed, the clamp plates 22 are removed along with collapsible mandrel members 20. The clamps 24 may be retained with the shell 3 during the pressure welding thereof, if so desired (FIG. 8).

Although the aforedescribed method dictates that the tank be formed in a stationary die, it is to be understood that any other suitable type die medium may be used. For example, the pre-wrapped structure may be placed together with the shaped explosive charge therein, into a large body of incompressible die-acting fluid such as water, as shown in FIG. 8.

It is obvious that with the aforedescribed method, large quantities of large size tanks may be expeditiously constructed near remote launch sites with a minimum of tooling, thereby permitting great savings in cost and development time. The utilization of rolled strips provides a compact easily transported construction material thus making it unnecessary to transport bulky pre-formed sheets, for example.

Application for this process may be found in rocket motor cases, rocket nozzles, storage tanks, pressure vessels and other tubular constructions which require a high strength to weight ratio.

I claim:

1. A method of producing a hollow high strength unitary structure comprising the steps of: forming a hollow structure by spiral wrapping a first high strength metallic strip about a mandrel so that the opposite edges thereof are in close abutting relation; wrapping a second high strength metallic strip about the first wrapped metallic strip covering the edges of said first strip which are in close abutting relation; and selectively orienting the grain direction thereof relative to the grain direction of the first high strength metallic strip; removing the first and second formed metallic strips from the mandrel; holding said wrapped strips in position; placing the first and second formed metallic strips within a female die corresponding to the desired finished external dimension of the finished structure; exerting an explosive shock force within the hollow of the structure and preventing substantial outward movement of said strips whereby the wrapped strips are pressure welded together to form a high strength unitary structure.

2. The method of claim 1 wherein the first high strength metallic strip and said second metallic strip comprise superimposed ribbons of steel and aluminum respectively.

3. A method for pressure welding high strength pressure tanks comprising the steps of: wrapping a first metallic strip about a mandrel with the opposite edges thereof in abutting relation; wrapping a second superimposed metallic strip around the first metallic strip so as to cover the abutting edges thereof; holding said wrapped strips in position to prevent the unwinding thereof; removing said structure from the mandrel; positioning the structure within a die cavity conforming to the finished external dimensions thereof; subjecting the inner walls of the structure to an explosive shock force and preventing substantial outward movement of said strips so as to form a high strength pressure welded tank.

4. The method of claim 3 wherein a thin plastic film is coated on the inner walls of the structure prior to subjecting an explosive shock force thereto.

5. The method of claim 4 further comprising the steps of filling the internal cavity of the structure with water and containing the water therein subsequent to coating the inner walls of the structure with a thin plastic film; and discharging an explosive shock force within said water.

6. A method for producing a unitary high strength shell member comprising the steps of: spiral wrapping a first metallic ribbon on a mandrel with the opposite edges thereof in abutting relation; spiral wrapping a second metallic ribbon on the first metallic ribbon so as to cover the abutting edges of the first metallic ribbon to form a tubular structure therewith; holding said wrapped strips in position; removing the tubular structure from the mandrel; placing the tubular structure within a die medium adapted to form it into a unitary high strength shell member; placing a shaped explosive charge within the cavity of the tubular structure; filling and containing a force distributing medium within the cavity; exploding the explosive charge so as to force the tubular structure against the die medium; and preventing substantial outward movement of said structure so as to pressure weld said ribbons into a unitary high strength shell member.

7. The method of claim 5 further comprising the step of coating ultra-high strength filaments on the external surfaces of the first thin metallic ribbon prior to the spiral wrapping of the second thin metallic ribbon.

8. The method of producing a unitary high strength shell member comprising the steps of: clamping a first end of a first metallic ribbon on radially spaced collapsible mandrel members which are held in their radially spaced position by clamp plates; spiral wrapping said first metallic ribbon on said mandrel members so that the opposite edges thereof are in abutting relation; clamping the second end of said first metallic strip on said mandrel members; clamping a first end of a second metallic strip adjacent the first end of said first metallic strip; spiral wrapping said second metallic strip over said first metallic strip so as to cover the abutting edges of said first metallic strip and form a hollow spirally wrapped structure; removing the clamp plates so as to collapse the mandrel members and free the clamped structure; holding said wrapped strips in position; placing the spirally wrapped structure in a die medium adapted to form it into a unitary high strength shell member; placing a shaped explosive charge within the hollow of the spirally wrapped structure; filling and containing a force distributing medium with the hollow; exploding the explosive charge so as to force the spirally wrapped structure against the die medium; and preventing substantial outward movement of said structure so as to pressure weld said ribbons into a unitary high strength shell member.

9. A method for forming an imperforate, hollow type structure comprising the steps of: spiral wrapping a first metallic member so that the opposite edges thereof are in juxtaposed relationship; spiral wrapping a second metallic member over the juxtaposed edges of said first member to thus form a hollow structure therewith; holding said wrapped members in position to prevent an unravelling thereof; discharging an explosive shock force in a fluid contained within said formed hollow structure; and preventing substantial outward movement of said members whereby said members are pressure welded to form said imperforate, hollow type structure.

10. A method for forming an imperforate hollow type structure comprising the steps of: forming a first hollow metallic shell shaped structure; spiral wrapping a continuous metallic member on said first shell shaped structure to form a second hollow metallic shell shaped structure; forming a third metallic shell shaped structure over said first and second shell shaped structures to form a substantially imperforate subassembly therewith; holding said formed subassembly in position to prevent the disassemblage thereof; discharging an explosive shock force in a fluid contained within said hollow first metallic shell structure; and preventing substantial outward movement of said subassembly whereby said structures are pressure welded to form said imperforate, hollow type structure.

11. The method of claim 10 wherein said first and third shell shaped structures comprise a steel constituent and said second shell shaped structure comprises an aluminum constituent.

12. A method for forming an imperforate, hollow type metallic structure comprising the steps of: forming a first hollow metallic shell shaped structure; placing metallic filament members on the periphery of said first shell structure; encapsulating said first shell structure and said filament members with a second metallic shell shaped structure; holding said structures in fixed position relative to each other; discharging an explosive shock force within a fluid contained within said first hollow shell structure; and preventing substantial outward movement of said second shell structure whereby said first and second shell structures and said filament members are pressure welded into an imperforate, hollow type metallic structure.

13. The method of claim 12 wherein said filament members are made of a material having a tensile strength substantially greater than that of the material of said first and second shell structures.

References Cited in the file of this patent

UNITED STATES PATENTS

| | | |
|---|---|---|
| 1,371,671 | Duryea et al. | Mar. 15, 1921 |
| 1,760,039 | Bundy | May 27, 1930 |
| 2,067,801 | Taylor | Jan. 12, 1937 |
| 2,253,093 | Raichle et al. | Aug. 19, 1941 |

(Other references on following page)

UNITED STATES PATENTS

| | | | |
|---|---|---|---|
| 2,288,094 | Karmazin | June 30, | 1942 |
| 2,433,966 | Van Keuren | Jan. 6, | 1948 |
| 2,539,450 | Magill | Jan. 30, | 1951 |
| 2,600,630 | Ferguson | June 17, | 1952 |
| 2,648,125 | McKenna et al. | Aug. 11, | 1953 |
| 2,790,628 | Barnes | Apr. 30, | 1957 |
| 2,975,259 | Osborn | Mar. 14, | 1961 |
| 3,025,596 | Ward et al. | Mar. 20, | 1962 |
| 3,036,374 | Williams | May 29, | 1962 |

FOREIGN PATENTS

| | | | |
|---|---|---|---|
| 766,741 | Great Britain | Jan. 27, | 1957 |

OTHER REFERENCES

The Explosives Engineer, March-April 1959.